United States Patent
Tomaru

(10) Patent No.: US 7,715,051 B2
(45) Date of Patent: May 11, 2010

(54) IMAGE FORMING APPARATUS AND METHOD FOR FORMING AN IMAGE ACCORDING TO IMAGE DRAWING DATA

(75) Inventor: Masashi Tomaru, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1480 days.

(21) Appl. No.: 10/925,729

(22) Filed: Aug. 25, 2004

(65) Prior Publication Data

US 2005/0046888 A1 Mar. 3, 2005

(30) Foreign Application Priority Data

Aug. 27, 2003 (JP) ............................. 2003-302466

(51) Int. Cl.
*G06K 15/02* (2006.01)
*H04N 1/60* (2006.01)
*H04N 1/23* (2006.01)
*H04N 1/387* (2006.01)
*H04N 1/405* (2006.01)
*H04N 1/407* (2006.01)
*G06F 3/12* (2006.01)

(52) U.S. Cl. ..................... 358/2.1; 358/1.13; 358/1.9; 358/1.2; 358/296; 358/448; 358/465; 358/3.01

(58) Field of Classification Search ............... None
See application file for complete search history.

(56) References Cited

U.S. PATENT DOCUMENTS 6,856,430 B1 * 2/2005 Gase ..................... 358/1.9

2002/0075501 A1 * 6/2002 Mantell et al. ............. 358/1.14
2003/0011801 A1 * 1/2003 Simpson et al. ............ 358/1.13
2003/0053102 A1 * 3/2003 Kelsey ...................... 358/1.13
2004/0196479 A1 * 10/2004 Foster et al. ................ 358/1.9
2007/0064257 A1 * 3/2007 Inoue et al. ................ 358/1.14

FOREIGN PATENT DOCUMENTS

JP 2000-301768 A 10/2000

* cited by examiner

*Primary Examiner*—Twyler L Haskins
*Assistant Examiner*—Myles D Robinson
(74) *Attorney, Agent, or Firm*—Panitch Schwarze Belisario & Nadel LLP

(57) ABSTRACT

An image forming apparatus receives printing data including image drawing data and job information specifying a name of an application program used to generate the image drawing data. The apparatus includes: a data analyzer which determines whether the image drawing data were generated by the application program; a data quantity assessor which analyzes the image drawing data to determine a quantity of data to be printed; and an image forming unit which forms an image by a first process if the image drawing data were not generated by the application program or the quantity of data to be printed does not exceed a predetermined threshold, and forms an image by a second process if the image drawing data were generated by the application program and the quantity of data to be printed exceeds the predetermined threshold.

20 Claims, 16 Drawing Sheets

FIG.6

| CONTROL NUMBER | PARTICULAR APPLICATION NAME |
|---|---|
| 1 | APPLICATION NAME 1 |
| 2 | APPLICATION NAME 2 |
| ⋮ | ⋮ |
| n | APPLICATION NAME n |
| ⋮ | ⋮ |
| N | APPLICATION NAME N |

FIG.7

| %% | TITLE | APPLICATION NAME n | END |
|---|---|---|---|

FIG.11

| INPUT VALUE [%] | OUTPUT VALUE [%] |
|:---:|:---:|
| 0 | 0 |
| 20 | 10 |
| 60 | 45 |
| 70 | 60 |
| 100 | 100 |
| ⋮ | ⋮ |
| ⋮ | ⋮ |
| ⋮ | ⋮ |

| INPUT VALUE [%] | OUTPUT VALUE [%] |
|---|---|
| 0 | 0 |
| 20 | 5 |
| 60 | 25 |
| 70 | 35 |
| 100 | 60 |
| ⋮ | ⋮ |
| ⋮ | ⋮ |
| ⋮ | ⋮ |

| 0 | 1 | 0 | 1 |
|---|---|---|---|
| 0 | 0 | 0 | 0 |
| 1 | 0 | 1 | 0 |
| 0 | 0 | 0 | 0 |
| 0 | 1 | 0 | 1 |

FIG.22

<CYAN>

| 1 | 1 | 1 | 1 |
|---|---|---|---|
| 1 | 1 | 1 | 1 |
| 1 | 1 | 1 | 1 |
| 1 | 1 | 1 | 1 |
| 1 | 1 | 1 | 1 |

<MAGENTA>

| 1 | 1 | 1 | 1 |
|---|---|---|---|
| 1 | 1 | 1 | 1 |
| 1 | 1 | 1 | 1 |
| 1 | 1 | 1 | 1 |
| 1 | 1 | 1 | 1 |

<YELLOW>

| 0 | 0 | 0 | 0 |
|---|---|---|---|
| 1 | 1 | 1 | 1 |
| 0 | 0 | 0 | 0 |
| 1 | 1 | 1 | 1 |
| 0 | 0 | 0 | 0 |

<BLACK>

| 0 | 0 | 0 | 0 |
|---|---|---|---|
| 1 | 1 | 1 | 1 |
| 0 | 0 | 0 | 0 |
| 1 | 1 | 1 | 1 |
| 0 | 0 | 0 | 0 |

IMAGE FORMING APPARATUS AND METHOD FOR FORMING AN IMAGE ACCORDING TO IMAGE DRAWING DATA

BACKGROUND OF THE INVENTION

1. Field of the Invention

The present invention relates to an image forming apparatus and method.

2. Description of the Related Art

Many conventional printers, copiers, facsimile machines, and so on employ an electrophotographic printing apparatus having a photosensitive drum. The surface of the drum is uniformly charged, then exposed to light in accordance with printing data to form a latent electrostatic image. The latent image is developed by application of toner particles, which are then transferred to paper and fused by heat and pressure to form a printed image.

A problem with this type of image forming apparatus is that printed images with, for example, large solid black areas consume excessive amounts of toner, making the printing process expensive. A similar problem occurs in printing apparatus that ejects drops of ink onto paper: images with large printed areas are expensive to print because they consume much ink. Natural or photographic color images, in which the entire surface of the paper may be covered with various colors of toner or ink, are particularly expensive to print.

The cost of printing such images can be reduced by decimating the printing data, that is, by selectively masking some of the bits in the final bit-mapped form of the printing data. If the selective masking process is carried out by software, however, considerable processing time is required and the printing speed is slowed accordingly. Furthermore, decimation may lead to discontinuities and other unwanted results. Japanese Unexamined Patent Application Publication No. 2000-301768 discloses a hardware method of decimation that avoids the delays of software decimation and also avoids unwanted discontinuities in the printed output.

To complicate the problem, the image may be formed on overhead projector (OHP) film instead of paper. To sharpen the image projected by the overhead projector, application programs that generate OHP images may process the image data so as to increase the density of, for example, background areas and reduce the density of, for example, text displayed on the background. As a result, different areas require different degrees of decimation, but it is difficult for either hardware or software to distinguish between the different types of areas. If the decimation process is omitted for OHP images, however, dense background areas can make these images very expensive to print.

More generally, whenever an image is processed in a particular way to improve the quality of the image, the improvement tends to interfere with subsequent decimation processing carried out to reduce the cost of printing the image. If an attempt is made to compensate for the effects of image processing, the decimation process becomes complex and inefficient.

SUMMARY OF THE INVENTION

An object of the present invention is to provide an efficient way to reduce the cost of forming images.

A more specific object is to provide an efficient way to reduce the cost of forming images generated by particular application programs, such as programs that generate OHP images.

The invention forms an image from printing data including image drawing data, by the following method. First, image printing data are analyzed to identify the processing means by which the image drawing data were generated. If the image drawing data were generated by particular processing means, the image drawing data are modified to reduce usage of a consumable image forming agent such as toner or ink, and an image is formed according to the modified image drawing data.

The invention also provides image forming apparatus employing the invented method. The apparatus includes at least a data analyzer, a data modifier, and an image forming unit.

Because the invented method modifies image drawing data instead of bit-mapped data generated from the image drawing data, the modifications require neither time-consuming software decimation operations, nor extra hardware.

Because the modification is made only for drawing data generated by particular application programs, unnecessary modifications can be avoided, and appropriate modifications can be carried out on different types of drawing data.

BRIEF DESCRIPTION OF THE DRAWINGS

In the attached drawings:

FIG. 6 illustrates a control table used in the first embodiment;

FIG. 7 illustrates the structure of the printing job information command in the first embodiment;

FIG. 11 illustrates part of an input-output table for the normal gray-scale correction in the first embodiment;

FIG. 22 shows examples of bit-mapped data in the second embodiment.

DETAILED DESCRIPTION OF THE INVENTION

Figure 1:
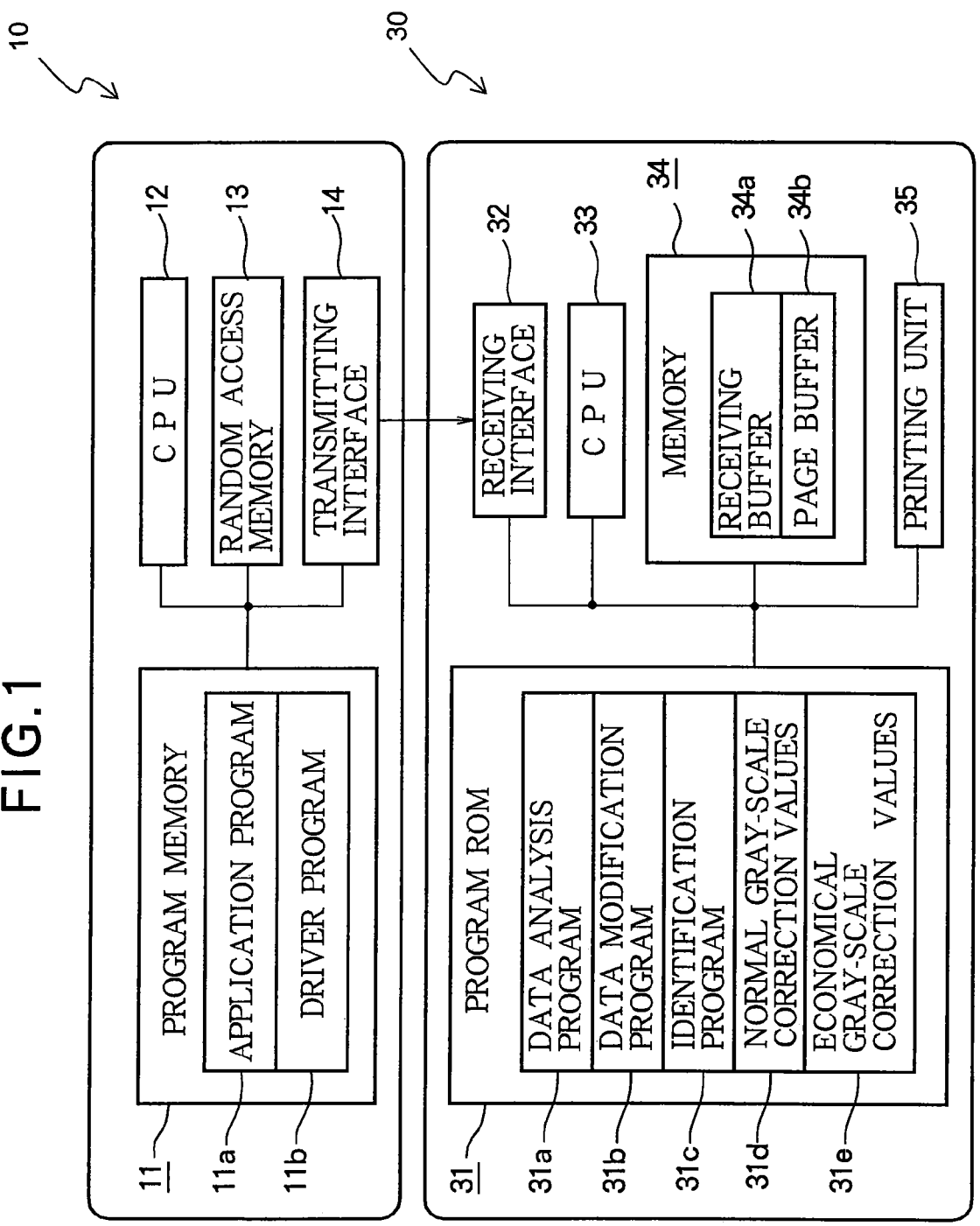
FIG. 1 is a block diagram of a printing control system in a first embodiment of the present invention.

Embodiments of the invention will now be described with reference to the attached drawings, in which like elements are indicated by like reference characters.

Referring to FIG. 1, in a first embodiment of the invention, printing data are generated in a host apparatus 10 such as a computer, sent to a printing apparatus 30, and printed by the printing apparatus 30. The host apparatus 10 and printing apparatus 30 constitute a printing control system.

The host apparatus 10 comprises a program memory 11, a central processing unit (CPU) 12, a random access memory 13, and a transmitting interface 14. The program memory 11 stores programs that are executed by the CPU 12. Among the stored programs are at least one application program 11a that generates application data, and at least one driver program 11b that generates printing data from the application data.

The printing apparatus 30 comprises a program read-only memory (ROM) 31, a receiving interface 32, a CPU 33, a random access memory 34, and a printing unit 35. The printing apparatus 30 operates in two modes: a normal mode and an economical mode or toner-saving mode.

The program ROM 31 stores control programs that are executed by the CPU 33 to control all of the modules in the printing unit 35 and perform other processing. Among the programs stored in the program ROM 31 are a data analysis program 31a that analyzes printing data a command at a time, a data modification program 31b that modifies the printing data to reduce the amount of toner consumed, and an identification program 31c that identifies the type of application program that generated the printing data. The program ROM 31 also stores data tables, including a table of normal gray-scale correction values 31d that are used for gray-scale correction in the normal mode, and a table of economical gray-scale correction values 31e used in the economical mode to reduce the amount of toner consumed.

The receiving interface 32 receives the printing data from the host apparatus 10. The memory 34 comprises a receiving buffer 34a that stores the received printing data and a page buffer 34b that stores bit-mapped data generated from the printing data after analysis of the data. The printing unit 35 produces printed output of the image formed according to the bit-mapped data. The printing unit 35 is an electrophotographic color printing unit employing the standard quartet of colors: cyan (C), magenta (M), yellow (Y), and black (K).

The combination of the data analysis program 31a, the identification program 31c, the CPU 33, and the memory 34 constitutes a data analyzer; the combination of the data modification program 31b, the tables of gray-scale correction values 31d, 31e, the CPU 33, and the memory 34 constitutes a data modifier; the combination of the data analysis program 31a, the CPU 33, the memory 34, and the printing unit 35 constitutes an image forming unit.

Figure 2:
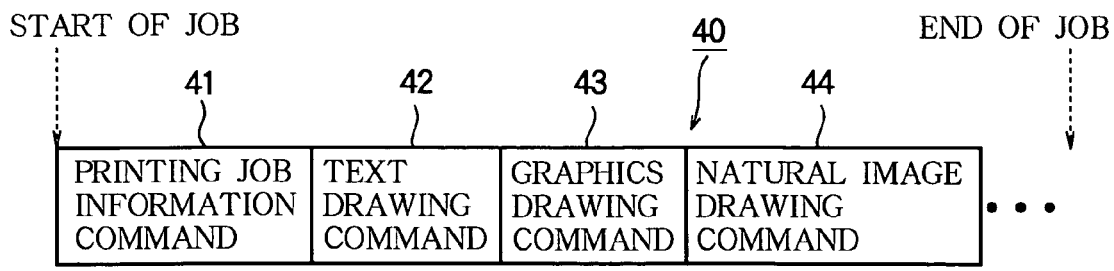
FIG. 2 illustrates the structure of printing data in the first embodiment.

Referring to FIG. 2, the printing data 40 for a printing job comprise four types of commands: a printing job information command 41 that gives various information about the printing data, text drawing commands 42 that describe text drawing procedures, graphics drawing commands 43 that describe graphics drawing procedures, and natural image drawing commands 43 that describe natural image drawing procedures. The printing job information command 41 is placed at the head of the printing data 40; the text drawing commands 42, graphics drawing commands 43, and natural image drawing commands 44 may occur in any order after the printing job information command.

The printing job information command 41 specifies, among other things, the processing means that generated the drawing commands. More specifically, the printing information includes the name of the application program 11a that created application data from which the printing data 40 were generated. This program name will be referred to below as the application name.

Many of the drawing commands 42, 43, 44 include gray-scale values. In monochrome printing, the gray-scale values specify black, white, and various intermediate levels of gray. In color printing, separate gray-scale values are also specified for each of three primary colors, which can be combined to print a wide gamut of colors. In the present embodiment, the gray-scale values given in the printing data 40 are modified by the data modification program 31b.

One reason for modifying the gray-scale values is to compensate for dot gain, which arises from interference between adjacent dots. The interference occurs because while the ideal dot shape of the printing apparatus 30 is square, the actual dot shape is round. As a result, mutually adjacent dots interfere with one another and the gray scale tends to saturate at the high-density end.

Figure 3:
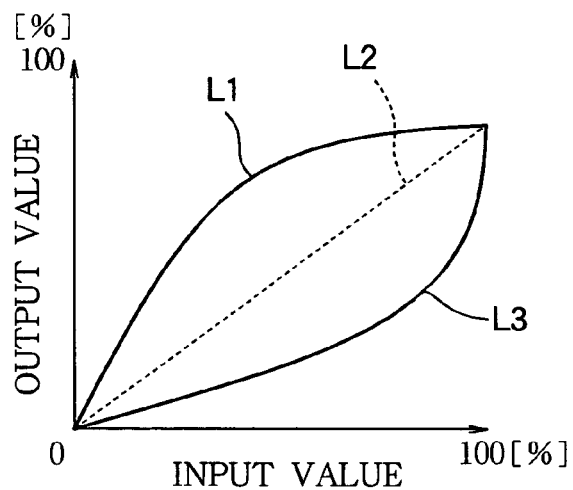
FIG. 3 illustrates a gray-scale correction applied during normal printing in the first embodiment.

Dot gain and the normal method of compensating for it are illustrated in FIG. 3. The horizontal axis indicates the gray level specified in the printing data; this gray level will be referred to as the input value. The vertical axis indicates the gray level perceived in the printed output; this level will be referred to as the output value. The dot gain is the amount by which output value exceeds the input value, generally expressed as a percent ratio. (If the output value is less than the input value, the dot gain is negative, but this does not occur in FIG. 3.) Curve L1 indicates the dot gain resulting from normal printing without compensation; dotted line L2 indicates the ideal input-output characteristic, which would be obtained if there were no interference between adjacent printed dots; curve L3 indicates the gray-scale correction applied during normal printing to make the actual output match the ideal output. This gray-scale correction is applied to each color of the CMYK quartet (cyan, magenta, yellow, and black), thereby maintaining tonality from the darkest to the lightest end of the gray scale across the entire gamut of output colors.

Figure 4:
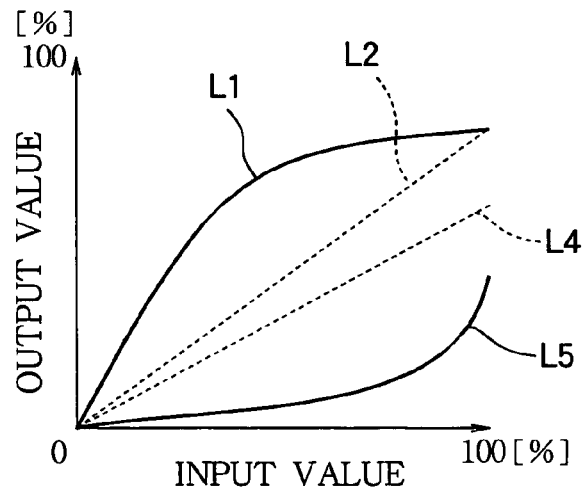
FIG. 4 illustrates a gray-scale correction applied during economical printing in the first embodiment.

In the present invention, when the printing apparatus operates in the economical mode, a different gray-scale correction is applied to conserve toner. This correction is illustrated in FIG. 4. L1 and L2 have the same meaning as in FIG. 3; dotted line L4 indicates the input-output characteristic desired for economical printing; curve L5 indicates the gray-scale correction applied to obtain the desired characteristic L4. As can be seen from a comparison of FIGS. 3 and 4, the economical gray-scale correction values are smaller than the normal gray-scale correction values. The output values during economical printing are therefore smaller than the ideal normal printing output values, so the printed colors are lighter and toner is conserved, but a continuous tonality is still maintained for all gray levels and all hues.

By using the gray-scale correction in FIG. 4, the present invention can conserve toner without the need for additional software or hardware modules, and can operate on the printing data 40 one command at a time, color by color. The operation of two versions of the first embodiment will now be described.

In both versions, first the driver program 11b in the host apparatus 10 generates printing data 40 according to application data created by the application program 11a. The printing data 40 are stored in the random access memory 13, then read out by the transmitting interface 14 and transferred to the printing apparatus 30.

In the printing apparatus 30, the receiving interface 32 receives the printing data 40 from the host apparatus 10 and stores the data in the receiving buffer 34a. Then the CPU 33 executes the data analysis program 31a to analyze the printing job information command 41 in the printing data 40 stored in the receiving buffer 34a and obtain the name of the application program that output the application data from which the printing data 40 were generated.

Next, the CPU 33 executes the identification program 31c to determine how the printing data 40 were generated. More specifically, the identification program 31c compares the application name with a list of the names of application programs known to generate images to be displayed by a particular type of output device other than the printing apparatus 30, e.g., by an overhead projector. These application programs will be referred to below as 'particular application programs' or 'particular applications', and their names will be referred to as 'particular application names'.

In a first version of the first embodiment, if the application name that was obtained from the printing job information command 41 is a particular application name, the CPU 33 executes the data modification program 31b to read, modify, and rewrite the printing data 40 stored in the receiving buffer 34a, operating according to the table of economical gray-scale correction values 31e, so as to reduce the amount of toner consumed. If the application name that was obtained from the printing job information command 41 is not a particular application name, the data modification program 31b is executed using the table of normal gray-scale correction values 31d to read, modify, and rewrite the printing data 40 stored in the receiving buffer 34a; this modification also reduces the amount of toner consumed, insofar as curve L3 lies below the dotted line L2 in FIG. 3.

In a second version of the first embodiment, if the application name that was obtained from the printing job information command 41 is a particular application name, the CPU 33 executes the data modification program 31b to read, modify, and rewrite the printing data 40 stored in the receiving buffer 34a, operating according to either the table of normal gray-scale correction values 31d or the table of economical gray-scale correction values 31e, depending on whether the normal printing mode or the economical printing mode has been selected. If the application name that was obtained from the printing job information command 41 is not a particular application name, the data modification program 31b is not executed, and the gray levels in the printing data 40 are used as is, without a gray-scale correction.

Next, the CPU 33 continues to execute the data analysis program 31a to read and analyze the rest of the printing data 40 in the receiving buffer 34a, generates bit-mapped data, stores the generated bit-mapped data in the page buffer 34b, and deletes the analyzed printing data 40 from the receiving buffer 34a. If the printing data 40 in the receiving buffer 34a have been modified by the data modification program 31b, the CPU 33 reads and analyzes the modified printing data.

After the bit-mapped data for one page have been generated, the CPU 33 executes an image-forming program (not shown in the drawings) to perform printing by reading the bit-mapped data from the page buffer 34b and sending the bit-mapped data to the printing unit 35.

Figure 5:
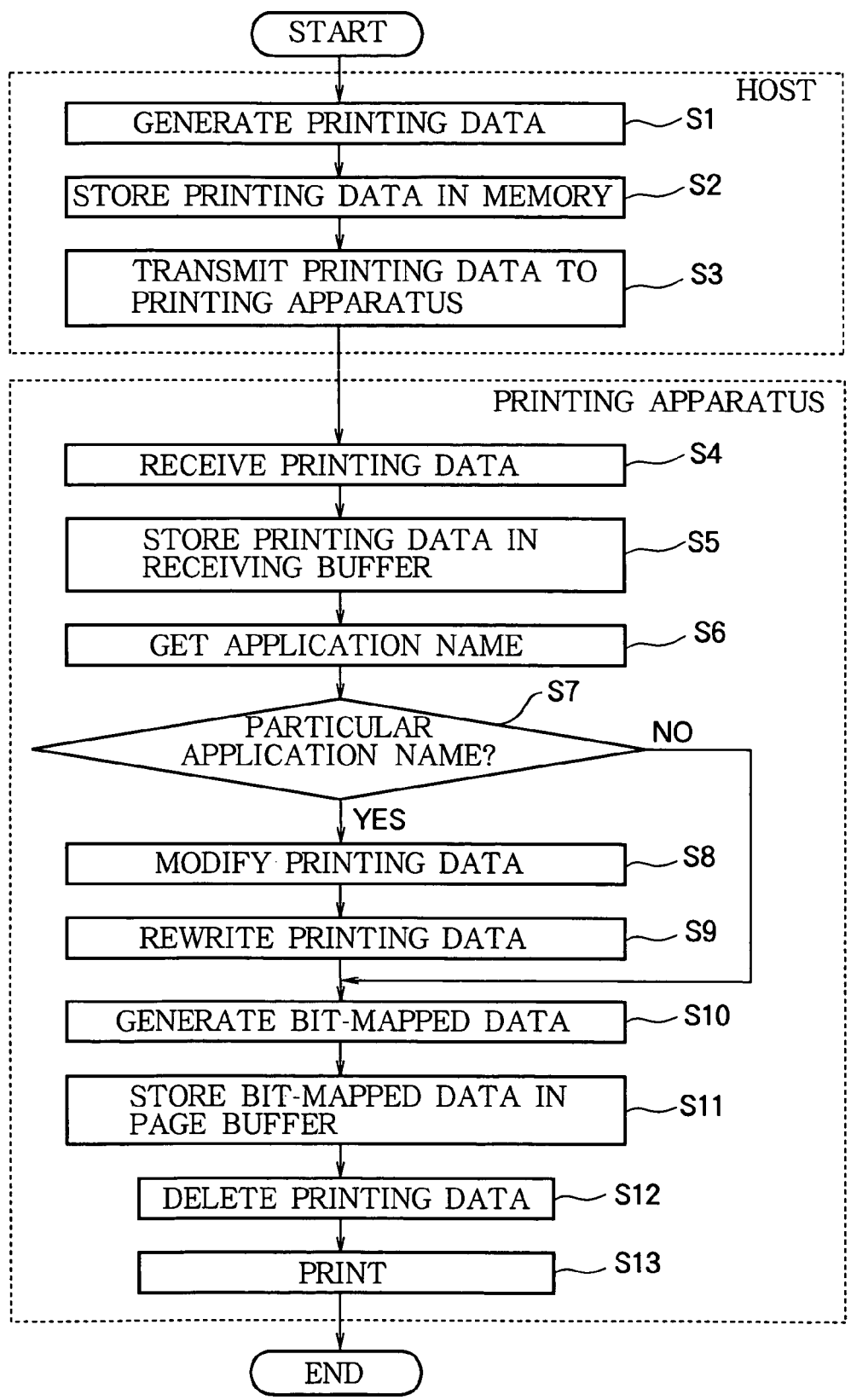
FIG. 5 is a flowchart illustrating the operation of the printing control system in the first embodiment.

The above printing procedure is summarized for the second version of the first embodiment in the flowchart in FIG. 5.

In step S1, an application program in the host apparatus 10 generates printing data 40.

In step S2, the printing data 40 are stored in the random access memory 13 in the host apparatus 10.

In step S3, the transmitting interface 14 transfers the printing data 40 to the printing apparatus 30.

In step S4, the receiving interface 32 in the printing apparatus 30 receives the printing data 40.

In step S5, the printing data 40 are stored in the receiving buffer 34a in the printing apparatus 30.

In step S6, the data analysis program 31a is executed and the name of the application program that generated the data is obtained.

In step S7, the identification program 31c is executed to decide whether the printing data 40 were generated by a particular application.

If the printing data 40 were generated by a particular application then the printing data 40 are modified in step S8, and the modified printing data 40 are written back into the receiving buffer 34a in step S9.

In step S10, bit-mapped data are generated from the printing data 40 now stored in the receiving buffer 34a.

In step S11, the bit-mapped data are stored in the page buffer 34b.

In step S12, the printing data 40 are deleted from the receiving buffer 34a.

In step S13, the bit-mapped data are sent to the printing unit 35 and the corresponding image is printed.

Next, the operation of the identification program 31c will be described in more detail. Referring to FIG. 6, the identification program 31c includes a control table of particular application names. This control table, which is stored in the identification program 31c in the program ROM 31 is a numbered list of application names (application name 1, application name 2, ..., application name n, ..., application name N), which are stored as character strings with corresponding control numbers 1, 2, ..., n, ..., N, constituting control data.

FIG. 7 illustrates the printing job information command 41 in the printing data 40. The printing job information command 41 includes identifying character strings such as '%%', 'TITLE', and 'END' for identification, and a character string giving an application name, indicated in the drawing as 'application name n'.

When the identification program 31c is executed, the CPU 33 reads the particular application names from the control table and compares them one by one with the application name in the printing job information command 41 until a match is found, or until the list of particular application names is exhausted.

More specifically, a control parameter is initialized to '1' at the beginning of the identification program 31c. If the control table in the identification program 31c includes a particular application name listed with a control number equal to the control parameter value, this particular application name is read and checked against the application name that was read from the printing job information command 41 by comparing their character strings. If they match, the process ends with a decision that the application name in the printing job information command 41 is a particular application name; otherwise, the control parameter value is incremented and the above process is repeated. If at some point the control table does not include any application name listed with a control number equal to the control parameter, the process ends with a decision that the application name in the printing job information command 41 is not a particular application name.

Figure 8:
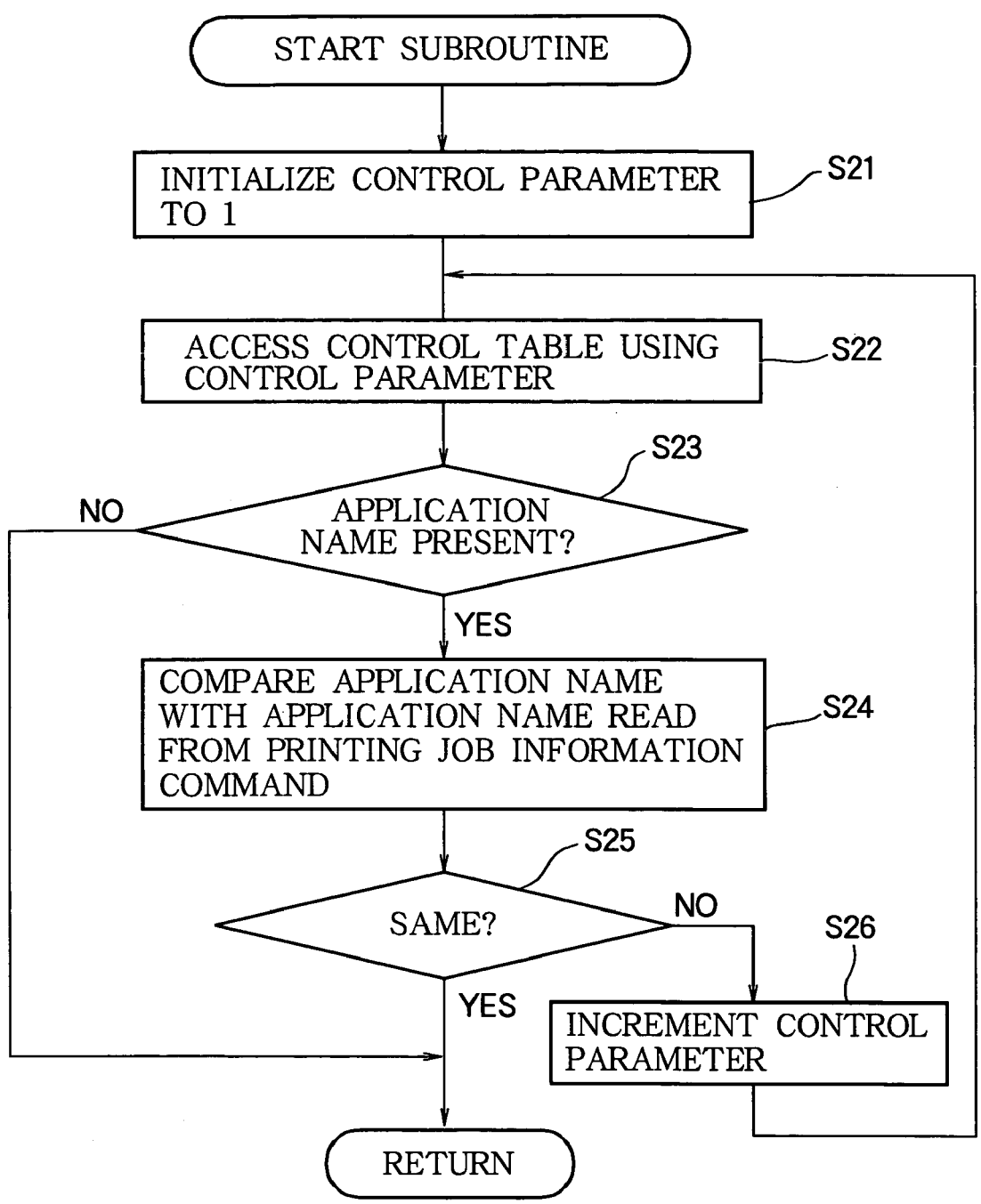
FIG. 8 illustrates an application determination subroutine used in the first embodiment.

These operations are executed as a subroutine summarized in the flowchart in FIG. 8.

In step S21, the control parameter is initialized to '1'.

In step S22, the control parameter value is used as an index to access the control table.

In step S23, whether the control table includes a particular application name listed with a control number equal to the control parameter value is determined. If it does, the process proceeds to step S24; otherwise, the process ends without returning a particular application name.

In step S24, the particular application name found in the control table is compared with the application name that was read from the printing job information command 41.

In step S25, whether the two application names match is determined. If they do, the process ends and returns the particular application name found in the control table. Otherwise, the process proceeds to step S26.

In step S26, the control parameter is incremented and the process returns to step S22.

As noted above, the gray-scale correction is carried out on printing data a command at a time. To facilitate execution of the data modification program 31b, however, the gray-scale correction values may be read from the program ROM 31 into the memory 34. The table of normal gray-scale correction values 31d is read at the beginning of a normal printing job; the table of economical gray-scale correction values 31e is read at the beginning of an economical printing job. As the job is executed, the data modification program 31b replaces the gray-scale values in each drawing command in the printing data 40 with corresponding values in the table read from the program ROM 31.

Figure 9:
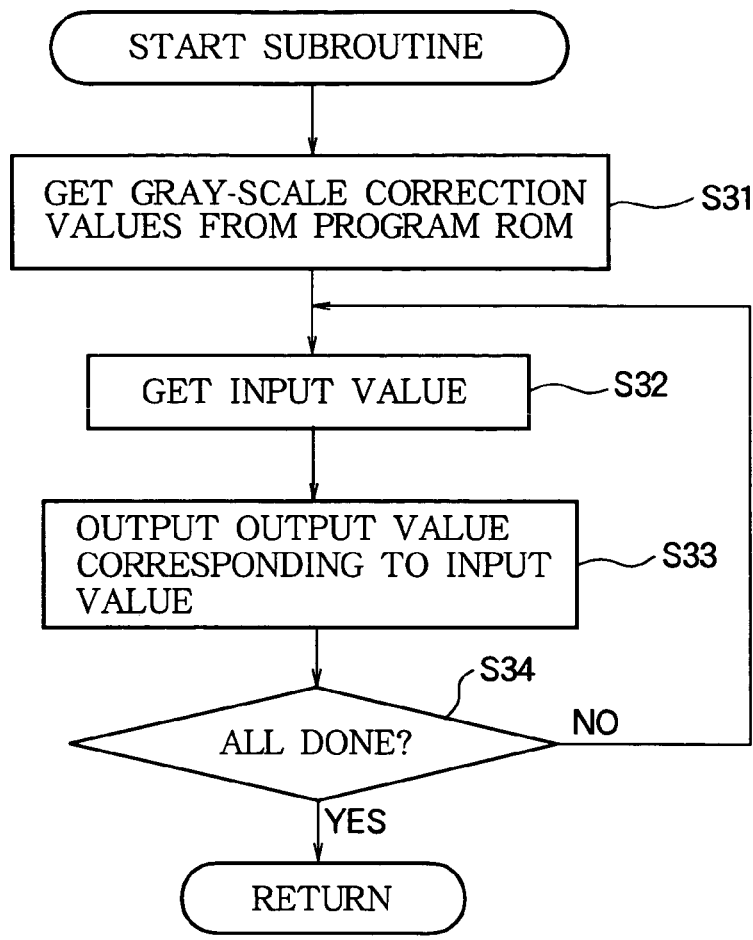
FIG. 9 illustrates a gray-scale correction subroutine used in the first embodiment.

The operation of the data modification program 31b for one command is shown in subroutine form in the flowchart in FIG. 9.

In step S31, the relevant table of gray-scale correction values is obtained from the program ROM 31 and copied into the random access memory 34. As noted above, this step is executed at the beginning of a printing job; normally, it is executed only for the first printing command in the printing job. It is also possible to set a pointer in the random access memory 34, pointing to the table in the program memory 31, instead of copying the entire table into the memory 34.

In step S32, an input gray-scale value is obtained from the command in the printing data 40.

In step S33, the output gray-scale value corresponding to the input gray-scale value is obtained from the table, and the input gray-scale value is replaced with the output gray-scale value in the command.

In step S34, a decision is made as to whether all gray-scale values in the command have been modified in this way. If they have, the process ends; otherwise, the process returns to step S32 to modify the next gray-scale value in the command.

Figure 10:
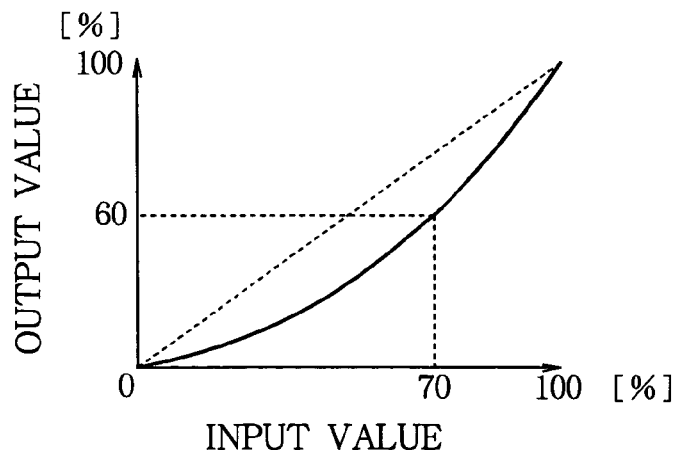
FIG. 10 illustrates the relationship between input and output values for a normal gray-scale correction in the first embodiment.

Next, the normal gray-scale correction will be described in more detail. For the normal gray-scale correction, output values are determined corresponding to input values according to the curve shown in FIG. 10. The input values (horizontal axis) and output values (vertical axis) are stored in the table of normal gray-scale correction values 31d in the program ROM 31 in the form schematically shown in FIG. 11. In the input/output table, the items in the first column are input values expressed in percent, and the items in the second column are output values (also expressed in percent) corresponding to the input values. Input value 70% corresponds to output value 60%, for example.

Figure 12:
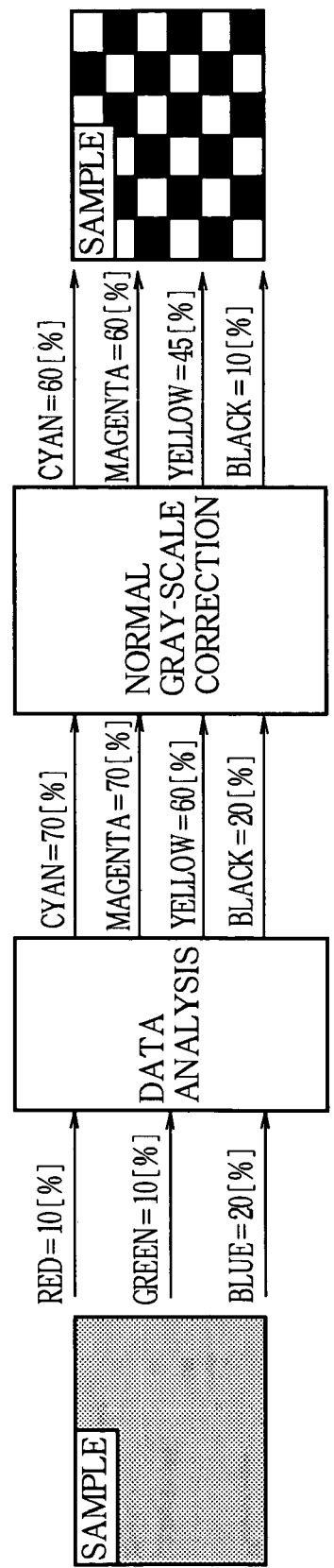
FIG. 12 illustrates a normal gray-scale correction in the first embodiment.

FIG. 12 shows a sample image generated in the host apparatus 10 in the red-green-blue (RGB) format with gray-scale values of 10% (red), 10% (green), and 20% (blue). The RGB image is converted to a cyan-magenta-yellow-black (CMYK) image with gray-scale values of 70% (cyan), 70% (magenta), 60% (yellow), and 20% (black) by the data analysis program 31a. The data modification program 31b operates on these CMYK values (70%, 70%, 60%, and 20%) as input values and converts them to the corresponding output values (60%, 60%, 45%, and 10%) to compensate for dot gain.

Next, an example of the economical gray-scale correction will be described. This example reduces toner consumption by 40%.

Figures 13, 14:
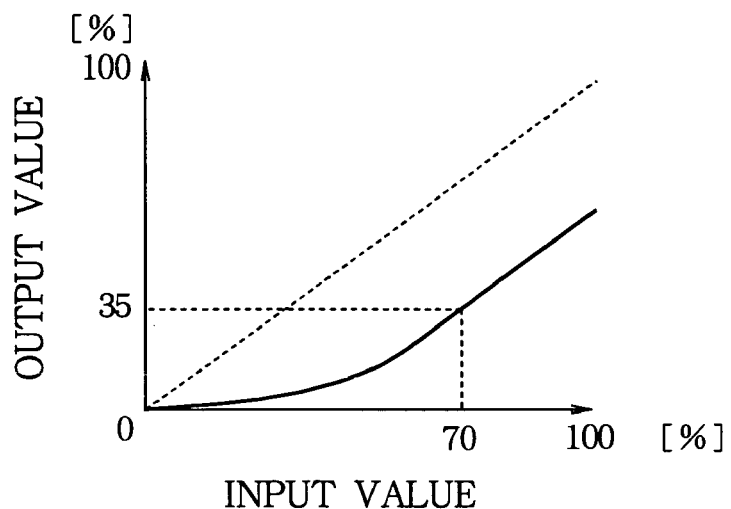
FIG. 13 illustrates the relationship between the input and output values for an economical gray-scale correction in the first embodiment.
FIG. 14 illustrates part of an input-output table for the economical gray-scale correction in the first embodiment.

For the economical gray-scale correction, output values are determined corresponding to input values as shown in FIG. 13, in which the horizontal axis indicates input values and the vertical axis indicates output values. These values are stored in the table of economical gray-scale correction values 31e in the program ROM 31 in the form shown schematically in FIG. 14. The items in the first column are input values expressed in percent; the items in the second column are the corresponding output values, also expressed in percent. Input value 70% corresponds to output value 35%, for example.

Figure 15:
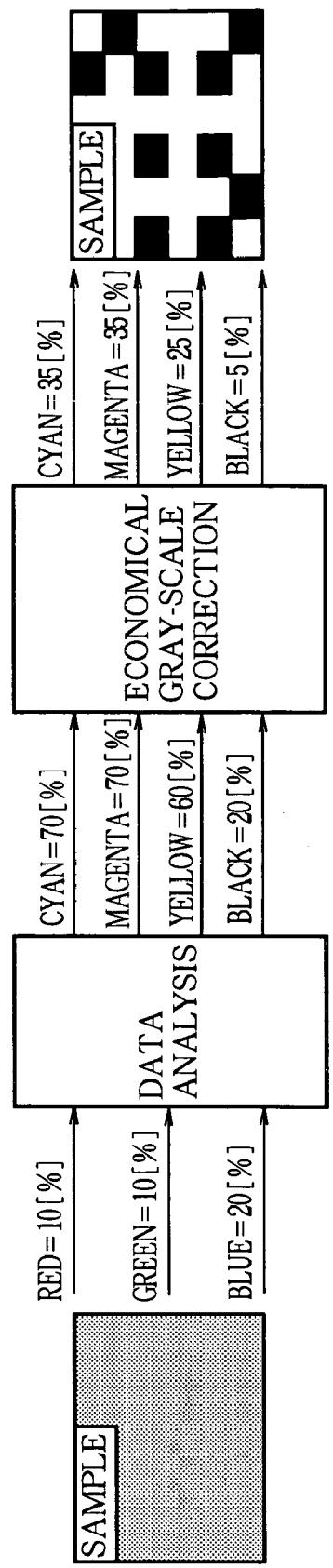
FIG. 15 illustrates an economical gray-scale correction in the first embodiment.

Referring to FIG. 15, the same RGB sample image as in FIG. 12, with gray-scale values of 10% (red), 10% (green), and 20% (blue), is converted by the data analysis program to a CMYK image with gray-scale values of 70% (cyan), 70% (magenta), 60% (yellow), and 20% (black). The converted values (70%, 70%, 60%, and 20%) are input to the data modification program as input gray-scale values, converted to the corresponding output values (35%, 35%, 25%, and 5%) and output, whereby the dot gain is reduced and the image density is also reduced.

Next, referring to FIGS. 16 and 17, exemplary results of printing with the normal gray-scale correction and the economical printing gray-scale correction will be described. In these examples, image density is reduced by separate adjustment of the density of text, the background area AR1, and drawing areas AR2 and AR3. The density of each toner color is also adjusted separately, to reduce the amount of toner consumed.

Figure 16:
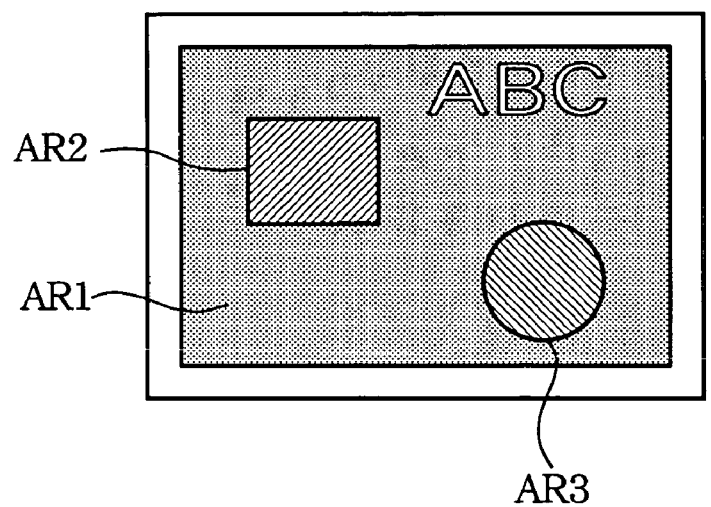
FIG. 16 illustrates an image resulting from normal gray-scale correction in the first embodiment.
Figure 17:
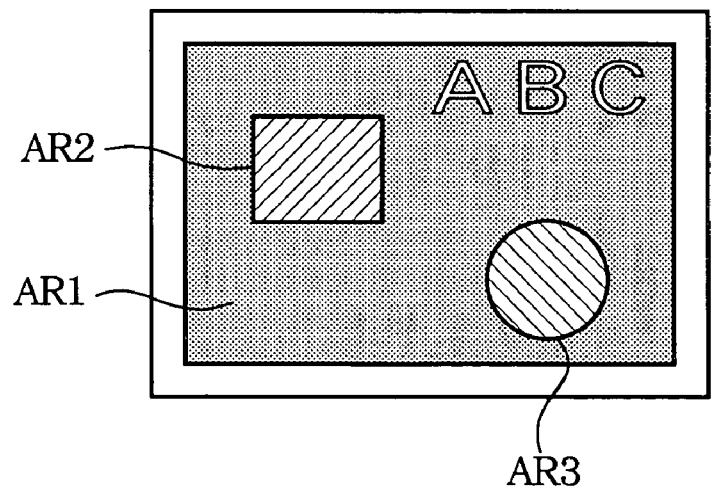
FIG. 17 illustrates an image resulting from economical gray-scale correction in the first embodiment.

The normal gray-scale correction, shown in FIG. 16, produces CMYK output values of 0% (cyan), 0% (magenta), 100% (yellow), and 10% (black) for text; output values of 60% (cyan), 60% (magenta), 45% (yellow), and 10% (black) for the background area AR1; output values of 0% (cyan), 100% (magenta), 100% (yellow), and 0% (black) for drawing area AR2; and output values of 100% (cyan), 100% (magenta), 0% (yellow), and 0% (black) for drawing area AR3. The economical gray-scale correction, shown in FIG. 17, produces CMYK output values 0% (cyan), 0% (magenta), 60% (yellow), and 0% (black) may for text; output values of 35% (cyan), 35% (magenta), 25% (yellow), and 5% (black) for the background area AR1; output values of 0% (cyan), 60% (magenta), 60% (yellow), and 0% (black) for drawing area AR2; and output values of 60% (cyan), 60% (magenta), 0% (yellow), and 0% (black) for drawing area AR3. For each color in each area, the economical output values are at least 40% less than the normal output values.

As described above, this embodiment modifies the printing data 40 to reduce the gray scale values, uses the normal gray-scale correction values 31d for normal printing, and switches to the economical gray-scale correction values 31e for economical printing, thereby reducing consumption of each color of toner.

In the first version of the first embodiment, the economical gray-scale correction values are used to compensate for the known tendency of particular application programs to generate large high-density image areas, the normal gray-scale correction being applied to printing data created by other application programs.

In the second version of the first embodiment, the gray-scale correction is carried out only in printing jobs generated by these particular application programs. Skipping the gray-scale correction for other printing jobs improves the efficiency and printing speed of the printing apparatus 30.

In both versions, the economical gray-scale correction values are applied only to printing data generated by the particular application programs.

Other versions of the first embodiment are also possible. For example, different degrees of economical printing may be selectable.

A second embodiment of the invention will be described below.

Figure 18:
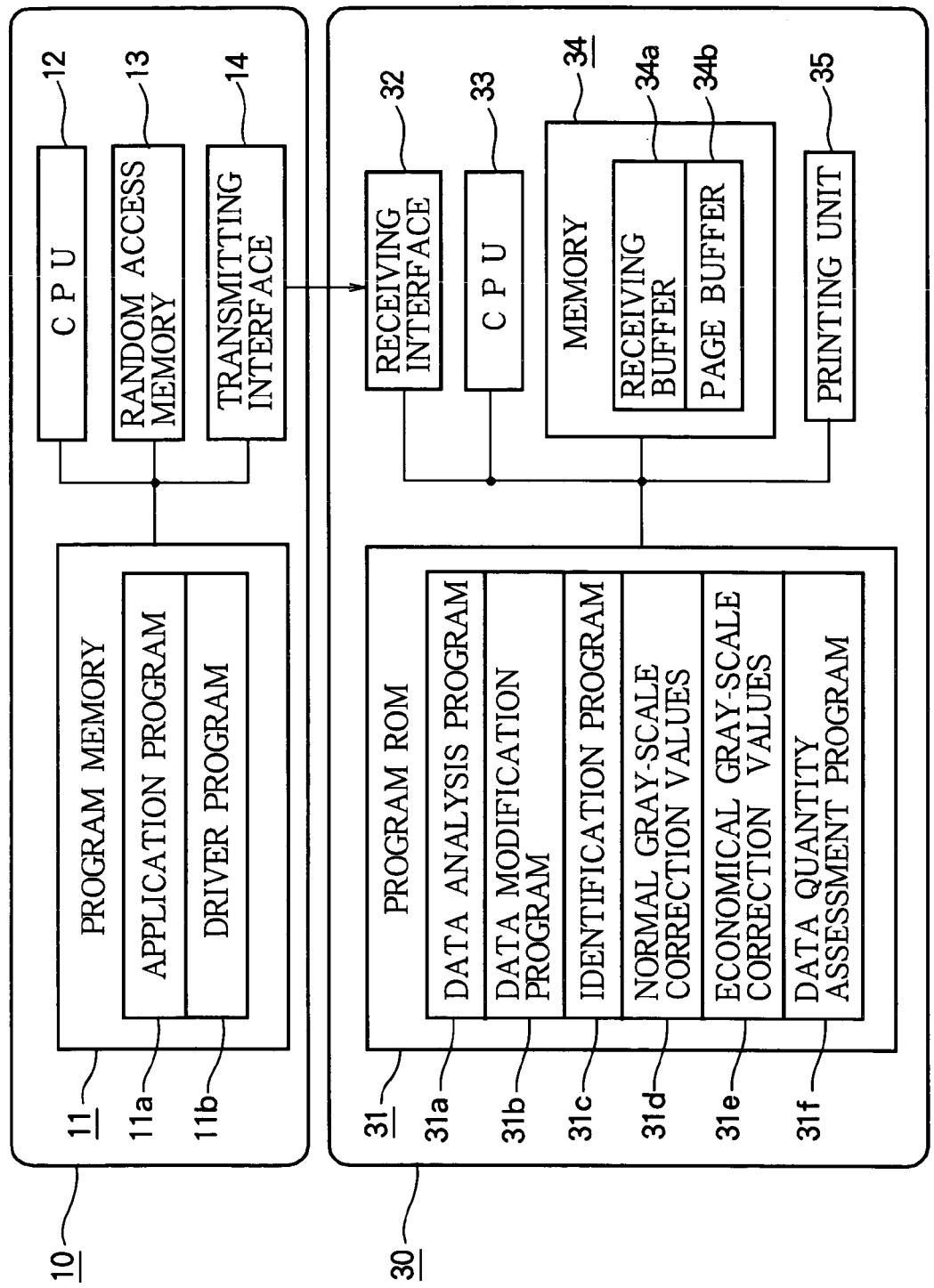
FIG. 18 is a block diagram of a printing control system in a second embodiment of the present invention.

Referring to FIG. 18, in addition to a data analysis program 31a, a data modification program 31b, an identification program 31c, a table of normal gray-scale correction values 31d, and a table of economical gray-scale correction values 31e, the program ROM 31 in the second embodiment stores a data quantity assessment program 31f that determines the amount of image data in bit-mapped data.

Figures 19A, 19B:
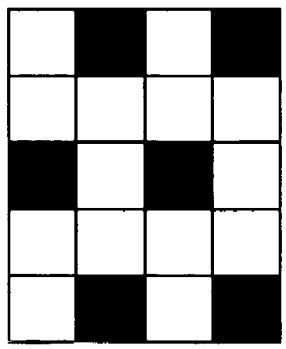
FIGS. 19A and 19B illustrate bit-mapped data in the second embodiment.

The amount of image data in bit-mapped data is the number of bits that specify printed dots. Referring to FIGS. 19A and 19B, bit-mapped data comprise bits with values of one (1) and zero (0), which are generated from the data resulting from the analysis of the printing data 40. The amount of image data in the bit-mapped data is the number of bits with values of one (1). For example, the amount of image data in the bit-mapped data shown in FIG. 19B is six, corresponding to the six dots in the image in FIG. 19A.

The printing apparatus 30 forms dots from the '1' bits in bit-mapped data, and thereby consumes toner (the recording agent). The amount of toner consumed increases in proportion to the amount of image data in the bit-mapped data.

The operation of the printing control system in the second embodiment will be described with reference to the flowchart in FIGS. 20 and 21.

In the host apparatus 10, the driver program 11b generates the printing data 40 according to application data created by the application program 11a. The printing data 40 are stored in the random access memory 13, read from the random access memory 13 by the transmitting interface 14, and then transferred to the printing apparatus 30.

In the printing apparatus 30, the receiving interface 32 stores the printing data 40 received from the host apparatus 10 in the receiving buffer 34a. The CPU 33 analyzes the printing job information command 41 of the printing data 40 in the receiving buffer 34a by executing the data analysis program 31a and obtains the name of the application program that generated the printing data 40.

Next, the CPU 33 uses the identification program 31c to determine whether the application name obtained from the printing job information command 41 is a particular application name, thereby determining whether the application is a particular application or not. As in the first embodiment, a particular application is an application that generates printing data 40 intended for output by a device other than the printing apparatus 30, such as an overhead projector.

If the application name obtained from the printing job information command 41 is a particular application name, the data analysis program reads the printing data 40 from the receiving buffer 34a, analyzes the drawing commands, generates bit-mapped data, and stores the bit-mapped data in the page buffer 34b. Then the CPU 33 executes the data quantity assessment program 31f to obtain the amount of image data in the bit-mapped data stored in the page buffer 34b, and decides whether the amount of image data is larger than a predetermined threshold.

If the amount of image data in the bit-mapped data is larger than the predetermined threshold, the CPU 33 deletes the bit-mapped data from the page buffer 34b, and executes the data modification program 31b to modify the printing data 40 in the receiving buffer 34a so as to reduce the amount of toner consumed. Next, the CPU 33 reads the modified printing data 40 from the receiving buffer 34a, analyzes it, generates corresponding bit-mapped data, stores the bit-mapped data in the page buffer 34b, and deletes the modified printing data 40 from the receiving buffer 34a. The CPU 33 then reads the bit-mapped data from the page buffer 34b and transfers the bit-mapped data to the printing unit 35, by which printing is performed.

If the application name obtained from the printing job information command 41 is not a particular application name, the data analysis program 31a generates bit-mapped data from the original printing data 40, stores the bit-mapped data in the page buffer 34b, and deletes the original printing data 40 from the receiving buffer 34a. The CPU 33 then transfers the bit-mapped data from the page buffer 34b to the printing unit 35 to be printed.

The predetermined threshold may be any value up to the amount of image data in all '1' bit-mapped data, which produces solid printing of all four of the CMYK colors (cyan, magenta, yellow, and black).

Figure 20:
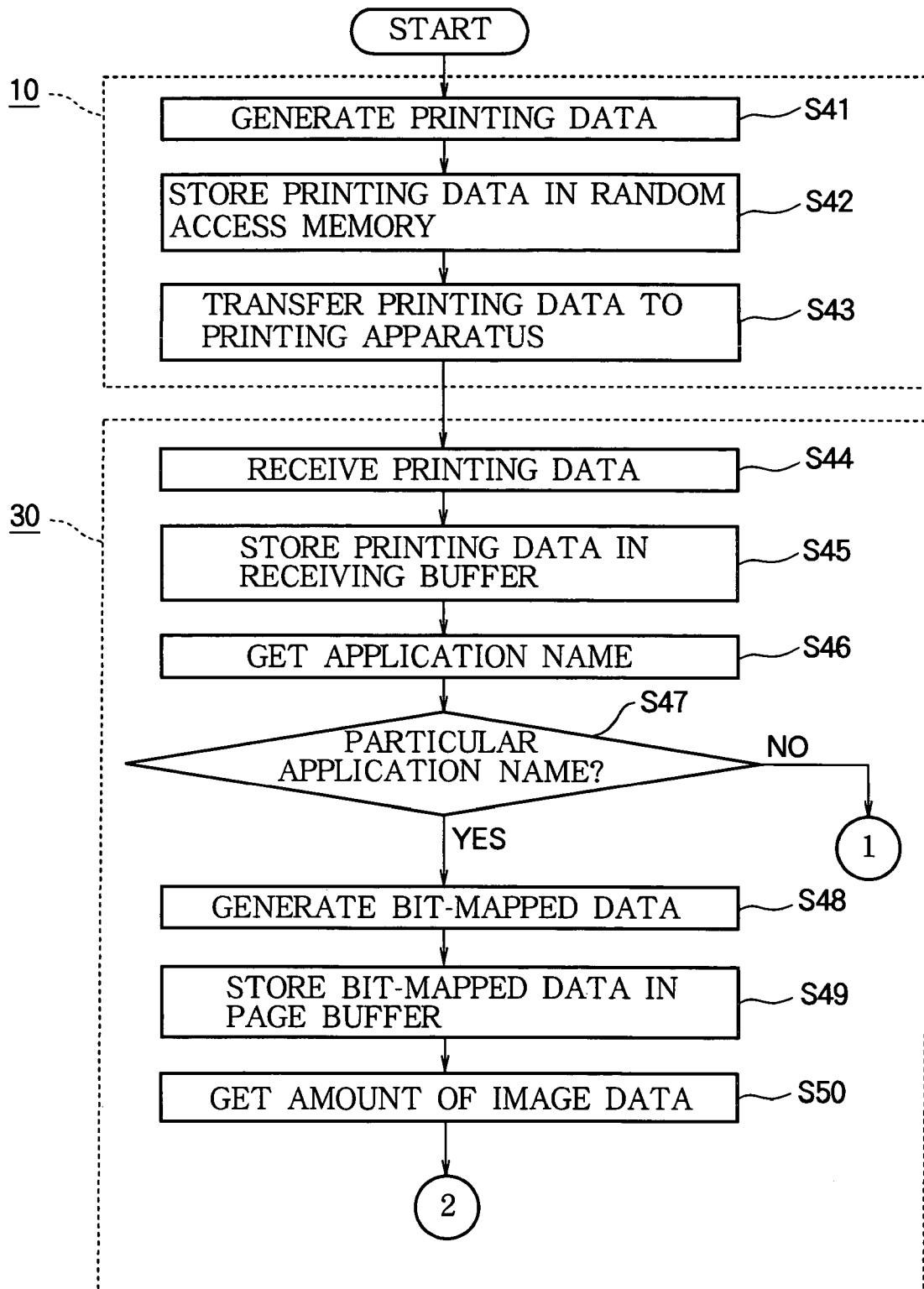
FIGS. 20 and 21 constitute a flowchart illustrating the operation of the printing control system in the second embodiment.
Figure 21:
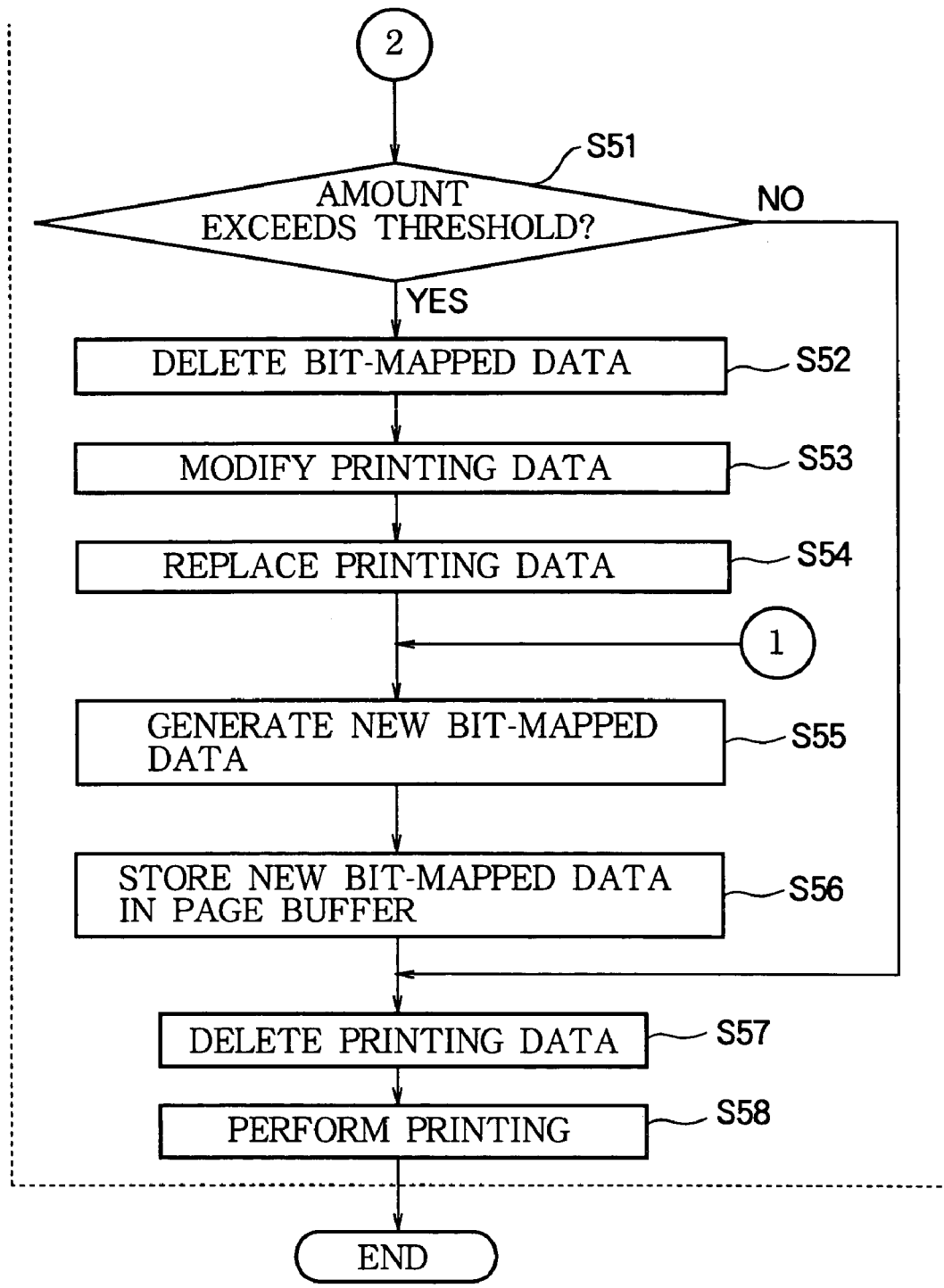

The operations of the printing control system in the second embodiment are summarized in the flowchart shown in FIGS. 20 and 21.

In step S41, an application program in the host apparatus 10 generates printing data 40.

In step S42, the printing data 40 are stored in the random access memory 13.

In step S43, the transmitting interface 14 transfers the printing data 40 to the printing apparatus 30.

In step S44, the receiving interface 32 in the printing apparatus 30 receives the printing data 40.

In step S45, the printing data 40 are stored in the receiving buffer 34a.

In step S46, the name of the application program that generated the printing data 40 is obtained from the printing job information command 41.

In step S47, this application name is compared with the particular application names listed in the identification program 31c to decide whether the printing data 40 were generated by one of the particular application programs. If so, the process proceeds to step S48; otherwise, the process proceeds to step S55 in FIG. 21.

In step S48, bit-mapped data are generated from the b20.

In step S49, the bit-mapped data are stored in the page buffer 34b.

In step S50, the data quantity assessment program 31f is executed to obtain the amount of image data in the bit-mapped data.

In step S51 in FIG. 21, whether the amount of image data in the bit-mapped data exceeds the predetermined threshold value is determined. If it does, the process proceeds to step S52; otherwise, the process proceeds to step S57.

In step S52, the bit-mapped data are deleted from the receiving buffer 34a.

In step S53, the data modification program 31b is executed to modify the printing data 40.

In step S54, the printing data 40 in the receiving buffer 34a are replaced with the modified printing data.

In step S55, new bit-mapped data are generated from the modified printing data.

In step S56, the new bit-mapped data are stored in the page buffer 34b.

In step S57, the printing data are deleted from the receiving buffer 34a.

In step S58, the bit-mapped data stored in the page buffer 34b are transferred to the printing unit 35 and printing is performed.

Next, the operation of comparing the amount of image data in bit-mapped data with the predetermined threshold will be described with reference to FIG. 22.

In this embodiment, as in the first embodiment, the printing apparatus 30 (FIG. 18) outputs four-color (CMYK) images. For simplicity, a hypothetical page having five rows and four columns of dots with the bit-mapped cyan data, the bit-mapped magenta data, the bit-mapped yellow data, and the bit-mapped black data shown in FIG. 22 will be discussed. The amount of image data is twenty in the cyan and magenta bit maps and eight in the yellow and black bit maps; the total amount of image data in the printed output is therefore fifty-six. The maximum possible amount of image data, which occurs when all bits in all of the bit maps are '1', is eighty. If the threshold value is forty, then the amount of image data (56) exceeds the threshold value, and a gray-scale correction is applied to reduce the amount of toner consumed.

As described above, since this embodiment reduces gray-scale values only when the application is a particular application and the amount of image data exceeds a predetermined threshold value, the gray-scale correction is not applied unnecessarily. If an OHP printing job includes many pages of sparse black text on a white background and just a few pages with full-color natural images or a solid background, for example, the gray-scale correction can be confined to the full-color pages; other pages can be printed without performing a gray-scale correction, making the printing process more efficient and improving the printing speed.

In a variation of the second embodiment, the economical gray-scale correction is applied when the printing data were generated by a particular application program and the amount of image data exceeds the predetermined threshold, and the normal gray-scale correction is applied in other cases.

Although the embodiments described above store the programs that identify the application program, assess the amount of image data on each page, and execute the gray-scale correction in the program ROM 31 and has these programs executed by the CPU 33 in the printing apparatus 30, these programs may also be stored in the host apparatus 10 and executed by its CPU 12, or stored in and executed by another computer not shown in the drawings.

Although the second embodiment determines the need for modification of the printing data 40 from the amount of image data in the bit-mapped data, it is also possible to make this decision by calculating the amount of image data from the printing data 40.

Those skilled in the art will recognize that further variations are possible within the scope of the invention, which is defined in the appended claims.

What is claimed is:

1. An image forming apparatus that receives printing data including image drawing data, and job information specifying a name of an application program used to generate the image drawing data, the apparatus comprising:
   a data analyzer for analyzing the job information to determine whether the image drawing data were generated by a particular application program for generating an image to be displayed by a projector;
   a data quantity assessor for analyzing the image drawing data to determine a quantity of data to be printed and comparing the quantity of data to be printed with a predetermined threshold; and
   a gray-scale correction value memory storing saving-mode gray-scale correction values that are used for gray-scale correction in a saving mode to reduce usage of a consumable image forming agent; and
   an image forming unit for forming a first image according to the image drawing data by a first process if the image drawing data were not generated by the particular application program, or the quantity of data to be printed does not exceed the predetermined threshold, and for forming a second image according to the image drawing data by a second process which uses the saving-mode gray-scale correction values if the image drawing data were generated by the particular application program and the quantity of data to be printed exceeds the predetermined threshold, the second process using less of a consumable image forming agent than the first process.

2. The image forming apparatus of claim 1, further comprising a memory storing control data for determining whether the image drawing data were generated by said particular application program.

3. The image forming apparatus of claim 2, wherein the control data comprise a table of application program names and said data analyzer determines that the image drawing data were generated by the particular application program if the application program name specified by the job information matches any of the application program names in said table.

4. The image forming apparatus of claim 1, further comprising a buffer memory, wherein the image forming unit generates bit-mapped data from the image drawing data and stores the bit-mapped data in the buffer memory.

5. The image forming apparatus of claim 4, wherein the data quantity assessor determines a number of bits representing image dots in the bit-mapped data.

6. The image forming apparatus of claim 1, wherein
   the gray-scale correction value memory also stores normal-mode gray-scale correction values that are used for gray-scale correction in a normal mode, and
   said first process uses the normal-mode gray-scale correction values.

7. An image forming apparatus that receives printing data including image drawing data, the apparatus comprising:
   a buffer memory;
   an image forming unit for generating bit-mapped data from the image drawing data, storing the bit-mapped data in the buffer memory, and forming an image according to the bit-mapped data;
   a data analyzer for analyzing the printing data to determine whether the image drawing data were generated by particular processing means;
   a data quantity assessor for determining a number of bits representing image dots in the bit-mapped data; and
   a data modifier for modifying the image drawing data to reduce usage of a consumable image forming agent if the image drawing data were generated by the particular processing means and the number of bits representing the image dots exceeds a predetermined threshold; wherein the data quantity assessor determines said number of bits from the image drawing data before the image forming unit generates the bit-mapped data.

8. An image forming apparatus, that receives printing data including image drawing data, the apparatus comprising:
   a buffer memory;

an image forming unit for generating bit-mapped data from the image drawing data, storing the bit-mapped data in the buffer memory, and forming an image according to the bit-mapped data;

a data analyzer for analyzing the printing data to determine whether the image drawing data were generated by particular processing means;

a data quantity assessor for determining a number of bits representing image dots in the bit-mapped data; and a data modifier for modifying the image drawing data to reduce usage of a consumable image forming agent if the image drawing data were generated by the particular processing means and the number of bits representing image dots exceeds a predetermined threshold; wherein the image forming unit deletes the bit-mapped data from the buffer memory, generates new bit-mapped data from the modified image drawing data, and stores the new bit-mapped data in the buffer memory, an image to be printed thus being formed from the new bit-mapped data.

9. A method of forming an image from printing data including image drawing data and job information specifying a name of an application program used to generate the image drawing data, the method comprising:

analyzing, by means of a data analyzer, the job information to determine whether the image drawing data were generated by a particular application program for generating an image to be displayed by a projector;

analyzing, by means of a data quantity assessor, the image drawing data to determine a quantity of data to be printed and comparing the quantity of data to be printed with a predetermined threshold;

storing, in a gray-scale correction value memory saving-mode gray-scale correction values that are used for gray-scale correction in a saving mode to reduce usage of a consumable image forming agent; and forming, by means of an image forming unit, a first image according to the image drawing data by a first process if the image drawing data were not generated by the particular application program or the quantity of data to be printed does not exceed the predetermined threshold, and for forming a second image according to the image drawing data by a second process which uses the saving-mode correction values if the image drawing data were generated by the particular application program and the quantity of data to be printed exceeds the predetermined threshold, the second process using less of a consumable image forming agent than the first process.

10. The method of claim 9, further comprising reading control data from a memory to determine whether the image drawing data were generated by said particular application program.

11. The method of claim 10, wherein the control data comprise a table of application program names and said analyzing the image drawing data determines that the image drawing data were generated by the particular application program if the application program name specified by the job information matches any of the application program names in said table.

12. The method of claim 9, wherein forming the first and the second images comprises generating bit-mapped data from the image drawing data and storing the bit-mapped data in a buffer memory.

13. The method of claim 12, wherein analyzing the image drawing data to determine the quantity of data to be printed further comprises determining a number of bits representing image dots in the bit-mapped data.

14. The method of claim 9, wherein
normal-mode gray-scale correction values that are used for gray-scale correction in a normal mode are also stored in the gray-scale correction value memory, and
said first process uses the normal-mode gray-scale correction values.

15. A method of forming an image by an image forming apparatus, comprising:

receiving, by means of a receiving interface, printing data including image drawing data:

generating, by means of an image forming unit, bit-mapped data from the image drawing data;

storing the bit-mapped data in a buffer memory;

forming, by means of the image forming unit, the image according to the bit-mapped data;

analyzing, by means of a data analyzer, the printing data to determine whether the image drawing data were generated by particular processing means;

determining, by means of a data quantity assessor, a number of bits representing image dots in the bit-mapped data from the image drawing data before the bit-mapped data are generated; and modifying, by means of the image forming unit, the image drawing data to reduce usage of a consumable image forming agent if the image drawing data were generated by particular processing means and the number of bits representing image dots exceeds a predetermined threshold.

16. A method of forming an image by an image forming apparatus, comprising:

receiving, by means of a receiving interface, printing data including image drawing data:

generating, by means of an image forming unit, bit-mapped data from the image drawing data;

storing the bit-mapped data in a buffer memory;

forming, by means of the image forming unit, the image according to the bit-mapped data;

analyzing, by means of a data analyzer, the printing data to determine whether the image drawing data were generated by particular processing means;

determining, by means of a data quantity assessor, a number of bits representing image dots in the bit-mapped data, the number of bits being determined from the bit-mapped data before the image is formed;

deleting, by means of the image forming unit, the bit-mapped data from the buffer memory if the image drawing data were generated by the particular processing means and said number of bits exceeds the predetermined threshold;

modifying, by means of the image forming unit, the image drawing data to reduce usage of a consumable image forming agent if the image drawing data were generated by the particular processing means and said number exceeds the predetermined threshold;

generating, by means of the image forming unit, new bit-mapped data from the modified image drawing data; and storing the new bit-mapped data in the buffer memory, the image thus being formed from the new bit-mapped data.

17. An image forming apparatus that receives printing data including image drawing data and job information specifying a name of an application program used to generate the image drawing data, the apparatus comprising:

a data analyzer for analyzing the job information to whether the image drawing data were generated by a particular application program for generating an image to be displayed by a projector;

a gray-scale correction value memory storing saving-mode gray scale correction values that are used for gray-scale correction in a saving mode to reduce usage of a consumable image forming agent;

an image forming unit for forming an image according to the image drawing data by a first process if the image drawing data were not generated by the particular application program, and for forming an image according to the image drawing data by a second process which uses the saving-mode gray-scale correction values if the image drawing data were generated by the particular application program, the second process using less of a consumable image forming agent than the first process.

18. The image forming apparatus of claim 17, wherein the gray-scale correction value memory also stores normal-mode gray-scale correction values that are used for gray-scale correction in a normal mode, and said first process uses the normal-mode gray-scale correction values.

19. A method of forming an image from printing data including image drawing data and job information specifying a name of an application program used to generate the image drawing data, comprising:

analyzing, by means of a data analyzer, the job information to determine whether the image drawing data were generated by a particular application program for generating an image to be displayed by a projector;

storing, in a gray-scale correction value memory, saving-mode gray scale correction values that are used for gray-scale correction in a saving mode to reduce usage of a consumable image forming agent; and forming, by means of an image forming unit, an image according to the image drawing data by a first process if the image drawing data were not generated by the particular application program, and for forming an image according to the image drawing data by a second process which uses the saving-mode gray-scale correction values if the drawing data were generated by the particular application program, the second process using less of a consumable image forming agent than the first process.

20. The method of claim 19, wherein normal-mode gray-scale correction values that are used for gray-scale correction in a normal mode are also stored in the gray-scale correction value memory, and said first process uses the normal-mode gray-scale correction values.

\* \* \* \* \*